(12) United States Patent
Henkel et al.

(10) Patent No.: US 11,843,478 B2
(45) Date of Patent: Dec. 12, 2023

(54) COMMUNICATION SYSTEM FOR A VEHICLE AND OPERATING METHOD THEREFOR

(71) Applicant: Robert Bosch GmbH, Stuttgart (DE)

(72) Inventors: Achim Henkel, Stuttgart (DE); Ricardo Gonzalez De Oliveira, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 195 days.

(21) Appl. No.: 17/477,923

(22) Filed: Sep. 17, 2021

(65) Prior Publication Data

US 2022/0094570 A1    Mar. 24, 2022

(30) Foreign Application Priority Data

Sep. 23, 2020  (DE) ............... 10 2020 211 932.5

(51) Int. Cl.
*H04L 12/42*   (2006.01)
*H04L 67/12*   (2022.01)
*H04L 12/40*   (2006.01)
*H04W 4/48*    (2018.01)

(52) U.S. Cl.
CPC ............. *H04L 12/42* (2013.01); *H04L 67/12* (2013.01); *H04W 4/48* (2018.02); *H04L 2012/40273* (2013.01)

(58) Field of Classification Search
CPC ............... H04L 12/42; H04L 67/12; H04L 2012/40273; H04W 4/48
See application file for complete search history.

(56) References Cited

U.S. PATENT DOCUMENTS

| | | | |
|---|---|---|---|
| 11,622,250 B2 * | 4/2023 | Hirano | H04L 12/42 701/48 |
| 2021/0347358 A1* | 11/2021 | Brendley | B60R 21/013 |
| 2022/0335056 A1* | 10/2022 | Itoh | G06F 16/285 |
| 2022/0374372 A1* | 11/2022 | Xian | H04W 4/48 |

* cited by examiner

*Primary Examiner* — Chandrahas B Patel
(74) *Attorney, Agent, or Firm* — NORTON ROSE FULBRIGHT US LLP; Gerard Messina

(57) ABSTRACT

A communication system for a vehicle, for example a motor vehicle. The communication system includes: multiple computing devices, which are connected to each other with the aid of a first communication network including a ring topology, and multiple function units, which are each associated with different functions of the vehicle and are assigned to different second communication networks, at least one function unit of the multiple function units including a data link to at least two different computing devices of the multiple computing devices.

18 Claims, 6 Drawing Sheets

COMMUNICATION SYSTEM FOR A VEHICLE AND OPERATING METHOD THEREFOR

FIELD

The present invention relates to a communication system for a vehicle.

The present invention further relates to a method for operating a communication system for a vehicle.

SUMMARY

Exemplary specific embodiments of the present invention relate to a communication system for a vehicle, for example a motor vehicle, including: multiple computing devices, which are connected to each other with the aid of a first communication network including a ring topology, and multiple function units, which are each associated with different functions of the vehicle and are assigned to different second communication networks, at least one function unit of the multiple function units including a data link to at least two different computing devices of the multiple computing devices.

In further exemplary specific embodiments of the present invention, it is provided that at least one of the second communication networks includes a data link to at least two different computing devices of the multiple computing devices.

In further exemplary specific embodiments of the present invention, it is provided that each of the second communication networks includes a data link to at least two different computing devices of the multiple computing devices.

In further exemplary specific embodiments of the present invention, it is provided that at least one function unit has a redundant design.

In further exemplary specific embodiments of the present invention, it is provided that at least one computing device of the multiple computing devices has a redundant design.

In further exemplary specific embodiments of the present invention, it is provided that the redundantly designed computing device is connected to at least one of the function units with the aid of redundant data links.

In further exemplary specific embodiments of the present invention, it is provided that two computing devices are provided in the first communication network.

In further exemplary specific embodiments of the present invention, it is provided that the two computing devices are designed to at least temporarily supervise each other.

In further exemplary specific embodiments of the present invention, it is provided that at least one first computing device of the multiple computing devices is designed to carry out tasks of or for driver assistance systems and/or to, for example, at least partially carry out automated driving.

In further exemplary specific embodiments of the present invention, it is provided that at least one second computing device of the multiple computing devices is designed to carry out tasks of or for a vehicle integration platform, for example for a drive train or power train and/or chassis and/or body and/or lights and/or heating, ventilation and air-conditioning technology or HVAC.

In further exemplary specific embodiments of the present invention, it is provided that at least one third computing device of the multiple computing devices is designed to carry out tasks of or for infotainment and/or connectivity.

In further exemplary specific embodiments of the present invention, it is provided that at least one of the multiple function units includes at least one of the following elements: a) control unit, b) actuator, c) sensor.

In further exemplary specific embodiments of the present invention, it is provided that at least one of the multiple function units is designed to carry out functions for at least one of the following aspects: a) distance measurement, e.g., with the aid of radar or camera, b) radar and/or LIDAR, c) camera, d) steering, e) brake, f) airbag, g) internal combustion engine, h) transmission, i) generator, j) interior, k) lights, l) human/machine interface, m) driver supervision system, n) vehicle infrastructure tasks, e.g., for power/data distribution or energy management/data preprocessing, such as zone control units or body controllers.

In further exemplary specific embodiments of the present invention, it is provided that the first communication network may at least partially, for example, completely transfer gigabit bandwidths, e.g., using data links based on gigabit Ethernet, LVDS, PCI (express) or HDBaseT.

In further exemplary specific embodiments, it is provided that at least one of the second communication networks includes a data link based on at least one of the following types: a) Ethernet, b) LVDS (Low Voltage Differential Signaling), c) CAN, d) FlexRay, e) LIN, f) MOST, g) HDBaseT, h) PCIe.

Further exemplary specific embodiments of the present invention relate to a vehicle, for example a motor vehicle, including at least one communication system according to the specific embodiments.

Further exemplary specific embodiments of the present invention relate to a method for operating a communication system for a vehicle, for example a motor vehicle, including: multiple computing devices, which are connected to each other with the aid of a first communication network including a ring topology, and multiple function units, which are each associated with different functions of the vehicle and are assigned to different second communication networks, at least one function unit of the multiple function units maintaining or using a data link to at least two different computing devices of the multiple computing devices.

Further exemplary specific embodiments of the present invention relate to a use of the communication system according to the specific embodiments and/or the vehicle according to the specific embodiments and/or the method according to the specific embodiments for at least one of the following elements: a) increasing an error tolerance of the communication system, b) avoiding a common cause error, c) supplying data to data sinks, d) establishing a diverse redundancy.

Further exemplary specific embodiments of the present invention result from the following description and the figures.

DETAILED DESCRIPTION OF EXAMPLE EMBODIMENTS

Figure 1:
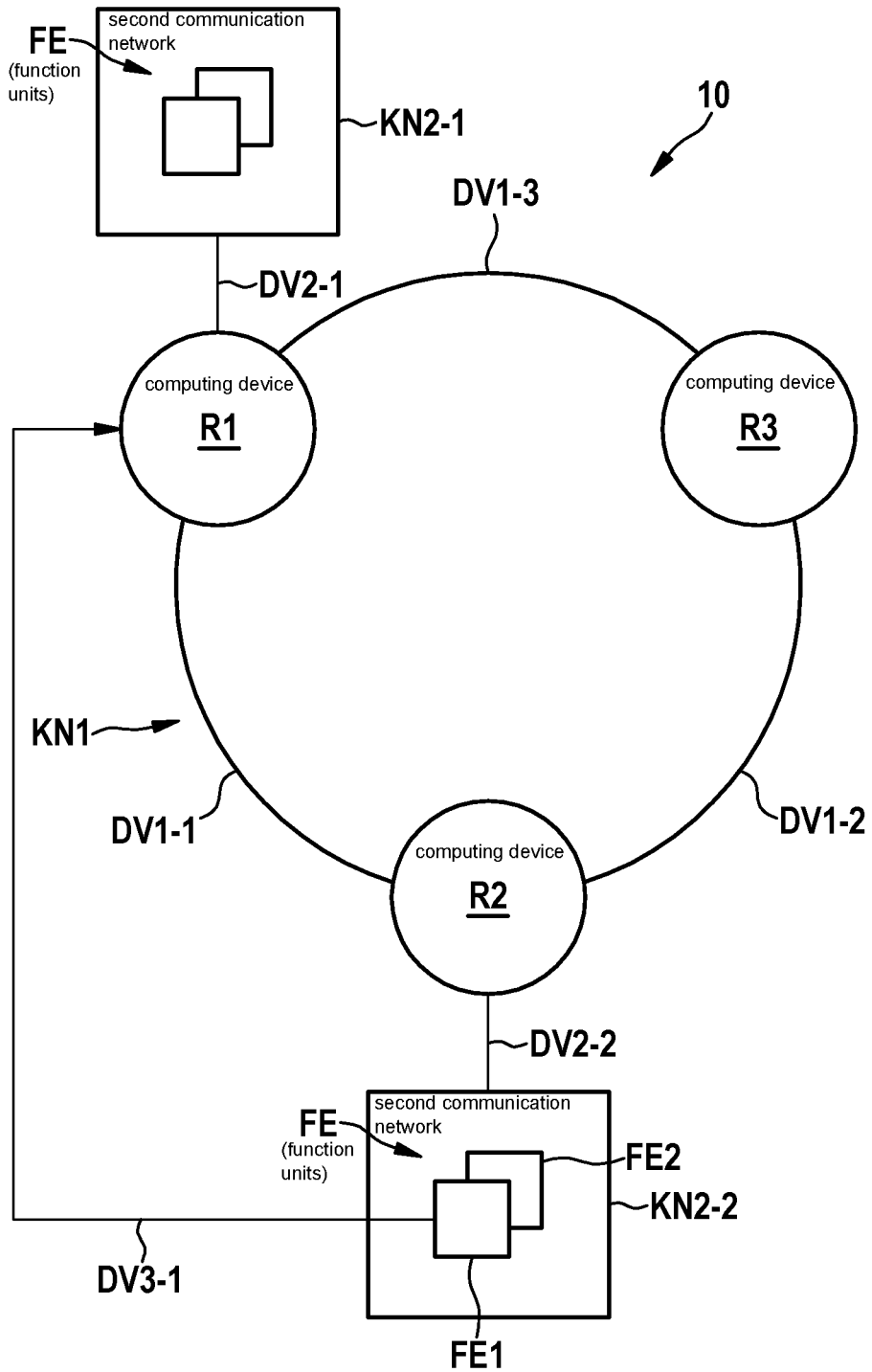
FIG. 1 schematically shows a simplified block diagram according to exemplary specific embodiments of the present invention.
Figure 6:
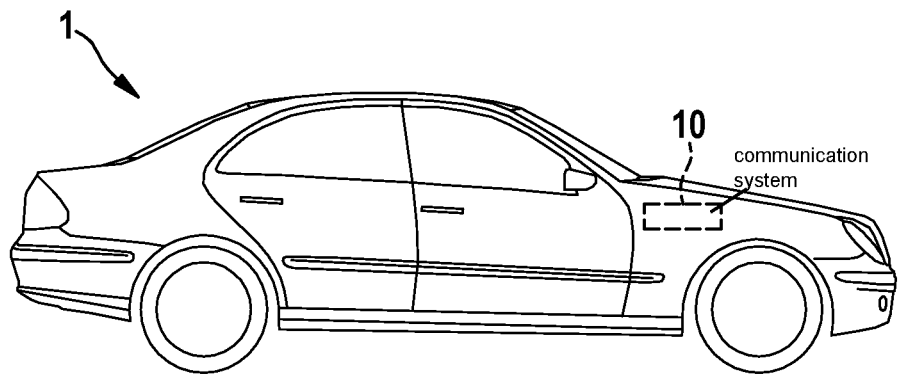
FIG. 6 schematically shows a simplified block diagram according to further exemplary specific embodiments of the present invention.

Exemplary specific embodiments, cf. FIGS. 1 and 6, relate to a communication system 10 for a vehicle 1, for example a motor vehicle 1, including: multiple computing devices R1, R2, R3 (FIG. 1), which are connected to each other with the aid of a first communication network KN1 including a ring topology, cf. data links DV1-1, DV1-2, DV1-3, and multiple function units FE, FE1, FE2, which are each associated with different functions of vehicle 1 (e.g., designed to carry out different functions for vehicle 1 or its components) and assigned to different second communication networks KN2-1, KN2-2, at least one function unit FE1 of the multiple function units including a data link DV2-2, DV3-1 to at least two different computing devices R1, R2 of the multiple computing devices. In further exemplary specific embodiments, a secure, error-tolerant data communication between the at least one function unit FE1 and relevant computing devices R1, R2 is made possible thereby. For example, the at least one function unit FE1 may, e.g. as a rule, without errors, exchange data with first communication network KN1 via data link DV2-2, and, if errors occur in data link DV2-2, the at least one function unit FE1 may exchange data with first communication network KN1 via data link DV3-1.

In further exemplary specific embodiments, computing devices R1, R2, R3 may also be referred to, for example, as ring computing units or ring computing devices.

In further exemplary specific embodiments, it is provided that at least one of second communication networks KN2-2 includes a data link DV2-2, DV3-1 to at least two different computing devices R1, R2 of multiple computing devices R1, R2, R3.

Figure 2:
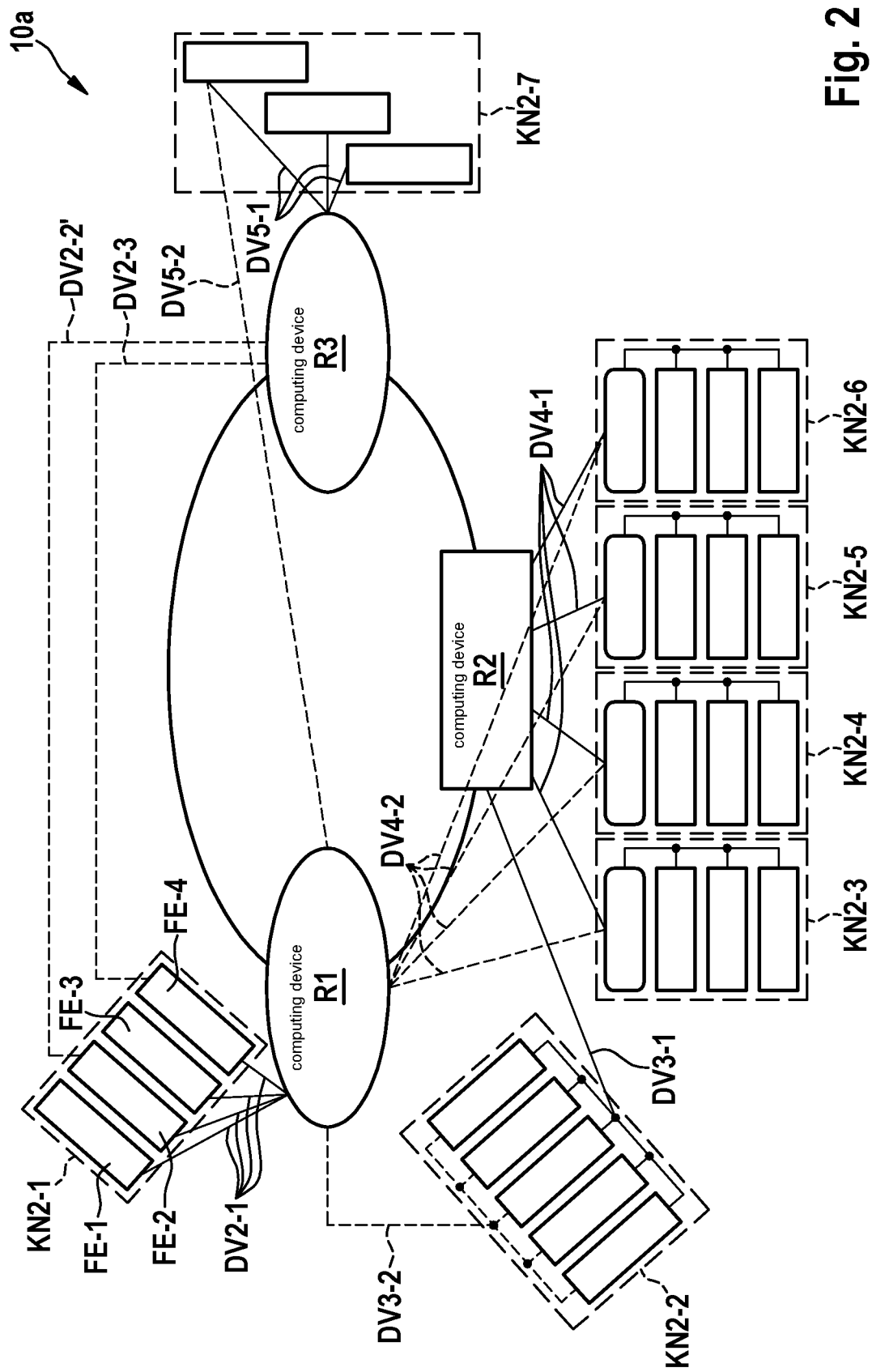
FIG. 2 schematically shows a simplified block diagram according to further exemplary specific embodiments of the present invention.

In further exemplary specific embodiments 10*a*, cf. FIG. 2, it is provided that each of second communication networks KN2-1, KN2-2, KN2-3, KN2-4, KN2-5, KN2-6, KN2-7 includes a data link to at least two different computing devices of the multiple computing devices.

In the present case, second communication network KN2-1 includes, for example, four function units FE-1, FE-2, FE-3, FE-4, which each include a first data link DV2-1 to first computing device R1. In addition, at least the two function units FE-2, FE-4 of second communication network KN2-1 are connected to further computing device R3 with the aid of redundant data links DV2-2', DV2-3.

In further exemplary specific embodiments, second communication network KN2-2 includes, for example, five function units, which are not marked in the present case, which each include a first data link DV3-1 to second computing device R2 and a second data link DV3-2 to first computing device R1.

Second communication networks KN2-3, KN2-4, KN2-5, KN2-6 similarly each include a first data link DV4-1 to second computing device R2 and a second (redundant) data link DV4-2 to first computing device R1.

In further exemplary specific embodiments, second communication network KN2-7 includes, for example, three function units, which are not marked in the present case, which each include a first data link DV5-1 to third computing device R3 and a second data link DV5-2 to first computing device R1.

In further exemplary specific embodiments, it is provided that at least one function unit has a redundant design. This applies to exemplary configuration 10*a* according to FIG. 2, e.g., for function units FE-1, FE2 as well as FE-3, FE-4.

Figure 3:
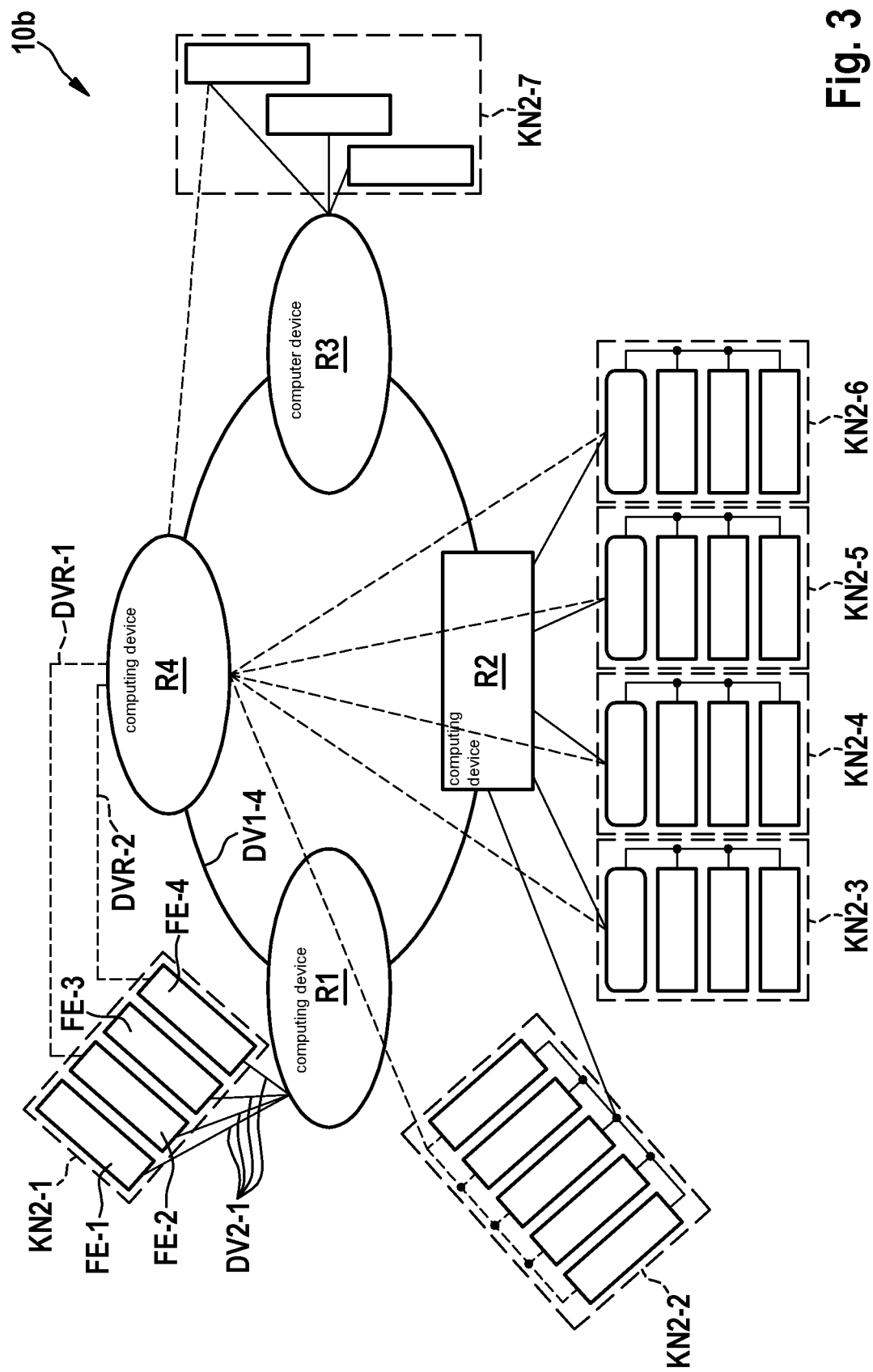
FIG. 3 schematically shows a simplified block diagram according to further exemplary specific embodiments of the present invention.

FIG. 3 schematically shows a simplified block diagram of a communication system 10*b* according to further exemplary specific embodiments. In addition to the configuration shown in FIG. 2, communication system 10*b* according to FIG. 3 includes a further computing device R4, which may be designed, for example, as a central fallback computing device, for example to at least temporarily replace at least one of the other computing devices if necessary or to take over at least parts of its function.

In further exemplary specific embodiments, it is provided that at least one computing device R1, R4 of the multiple computing devices has a redundant design.

In further exemplary specific embodiments, it is provided that redundantly designed computing device R1, R4 is connected to at least one of function units FE-2, FE-4 with the aid of redundant data links DV2-1, DVR-1, DVR-2.

Figure 4:
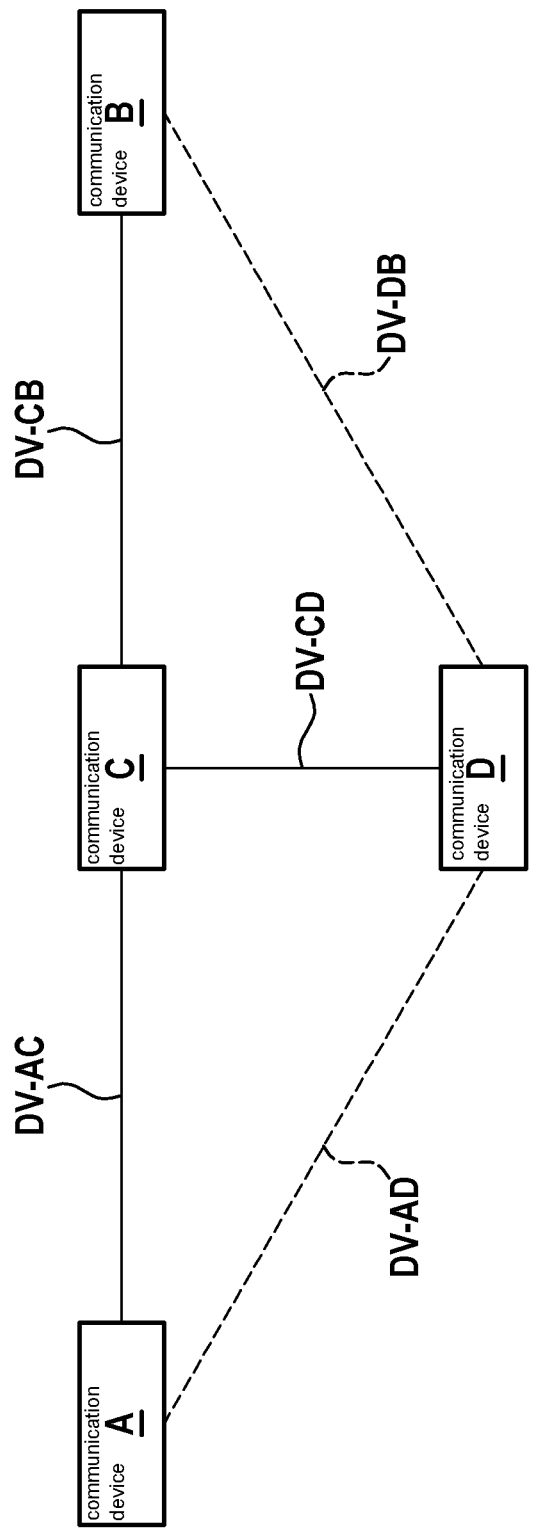
FIG. 4 schematically shows a simplified block diagram according to further exemplary specific embodiments of the present invention.

FIG. 4 schematically shows a simplified block diagram according to further exemplary specific embodiments, e.g., for illustrating a diverse redundancy. For example, four communication devices A, B, C, D are illustrated, which are each connected to each other via data links DV-AC, DV-CB, DV-AD, DV-CD, DV-DB. For example, data link DV-AC is of the CAN-FD type, data link DV-CB is of the Ethernet type, data link DV-AD is of the Ethernet or FlexRay type, data link DV-DB is of the CAN-XL or PCI type, etc. A technological redundancy therefore results between communication devices A, B, C, D, which may help to avoid a common cause error of the data links, e.g. in further exemplary specific embodiments.

Figure 5:
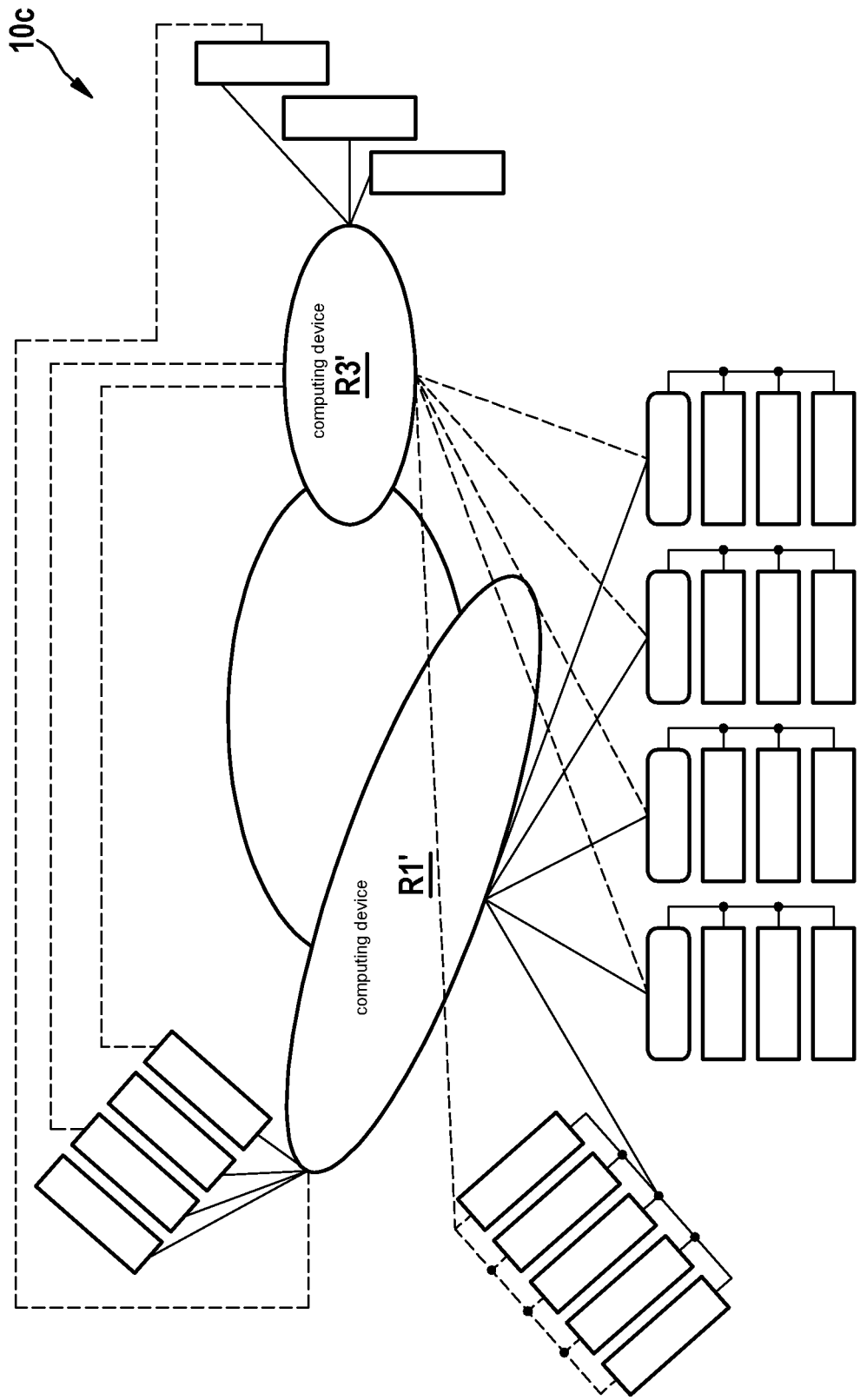
FIG. 5 schematically shows a simplified block diagram according to further exemplary specific embodiments of the present invention.

In further exemplary specific embodiments, FIG. 5, it is provided that two computing devices R1', R3' are provided in the first communication network. The individual function units of the second communication networks and/or the second communication networks may be, for example, redundantly connected to each other and/or to the two computing devices R1', R3' with the aid of at least two different data links.

In further exemplary specific embodiments, it is provided that the two computing devices R1', R3' are designed to at least temporarily supervise each other and/or to at least temporarily take over functions, e.g. emergency operation functions, of the other computer device in each case. This is possible due to the redundant data links according to further exemplary specific embodiments.

In further exemplary specific embodiments, FIG. 2, it is provided that at least one first computing device R1 of the multiple computing devices is designed to carry out tasks of or for driver assistance systems and/or to, for example, at least partially carry out automated driving.

In further exemplary specific embodiments, it is provided that at least one second computing device R2 of the multiple computing devices is designed to carry out tasks of or for a vehicle integration platform, for example for a drive train or power train and/or chassis and/or body and/or lights and/or heating, ventilation and air-conditioning technology or HVAC.

In further exemplary specific embodiments, it is provided that at least one third computing device R3 of the multiple computing devices is designed to carry out tasks of or for infotainment and/or connectivity.

In further exemplary specific embodiments, it is provided that at least one of multiple function units FE includes at least one of the following elements: a) control unit, b) actuator, c) sensor.

In further exemplary specific embodiments, it is provided that at least one of multiple function units FE is designed to carry out functions for at least one of the following aspects: a) distance measurement, e.g., with the aid of radar, b) radar (e.g., monitoring the surroundings), c) camera, d) steering, e) brake, f) airbag, g) internal combustion engine, h) transmission, i) generator, j) interior, k) lights, l) human/machine interface, m) driver supervision system.

In further exemplary specific embodiments, it is provided that first communication network KN1 (FIG. 1) includes gigabit Ethernet-based, for example, multi-gigabit Ethernet-based data links DV1-1, DV1-2, DV1-3.

In further exemplary specific embodiments, it is provided that at least one of second communication networks KN2-1 includes a data link DV2-1 based on at least one of the following types: a) Ethernet, b) LVDS, c) CAN, d) FlexRay, e) LIN, f) MOST, g) PCIe, h) COAX, i) HDBaseT.

Further exemplary specific embodiments, FIG. 6, relate to a vehicle 1, for example a motor vehicle 1, including at least one communication system 10 according to the specific embodiments.

Further exemplary specific embodiments relate to a method for operating a communication system 10 for a vehicle 1, for example a motor vehicle 1, including: multiple computing devices R1, R2, R3, which are connected to each other with the aid of a first communication network KN1 including a ring topology, and multiple function units FE, which are each associated with different functions of vehicle 1 and are assigned to different second communication networks KN2-1, KN2-2, . . . , at least one function unit FE of the multiple function units maintaining or using a data link to at least two different computing devices R1, R2 of the multiple computing devices.

Figure 7:
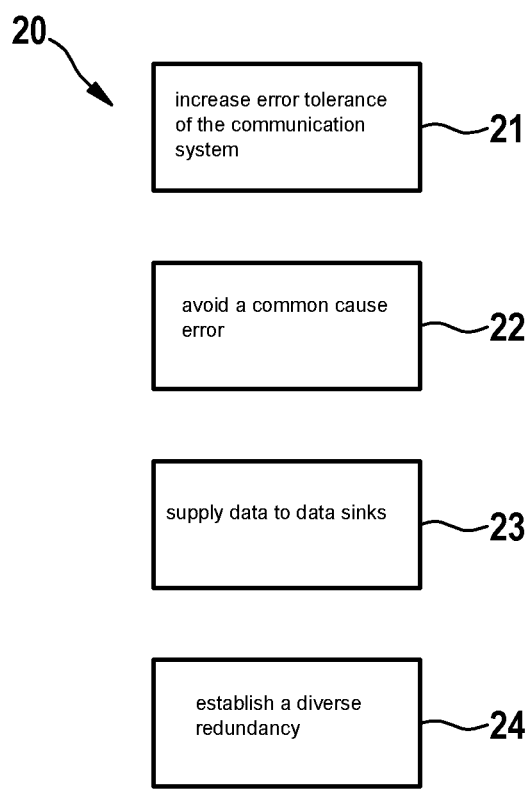
FIG. 7 schematically shows aspects of uses according to further exemplary specific embodiments.

Further exemplary specific embodiments, FIG. 7, relate to a use 20 of communication system 10 according to the specific embodiments and/or vehicle 1 according to the specific embodiments and/or the method according to the specific embodiments for at least one of the following elements: a) increasing 21 an error tolerance of the communication system, b) avoiding 22 a common cause error, c) supplying 23 data to data sinks, d) establishing 24 a diverse redundancy.

The principle according to the specific embodiments may contribute to the provision of an error-tolerant architecture, which, e.g., in the case of initial errors, e.g., in the area of a first data link, has a possibly limited functionality, which contributes, for example, to the preservation of a safe behavior of vehicle 1.

At least some exemplary specific embodiments may at least temporarily yield one or multiple of the following advantages: a) an architectonic achievement of the error tolerance; b) ensuring access from remaining "computing center(s) R1, R2, R3 to the (e.g., embedded) substructure of second communication networks; c) ensuring the access of function units FE, e.g., to embedded control units, e.g., to software functions of "computing centers" R1, R2, R3; d) easy expandability of known structures; e) cost-efficient measure for the error tolerance; f) a diverse redundancy is possible due to different communication technologies.

What is claimed is:

1. A communication system for a vehicle, comprising:
   multiple computing devices which are connected to each other using a first communication network including a ring topology; and
   multiple function units which are each associated with different functions of the vehicle and are assigned to different second communication networks, at least one function unit of the multiple function units including a data link to at least two different computing devices of the multiple computing devices;
   wherein two computing devices are provided in the first communication network; and
   wherein the two computing devices are configured to at least temporarily supervise each other.

2. The communication system as recited in claim 1, wherein the vehicle is a motor vehicle.

3. The communication system as recited in claim 1, wherein at least one of the second communication networks includes a data link to at least two different computing devices of the multiple computing devices.

4. The communication system as recited in claim 1, wherein each of the second communication networks includes a data link to at least two different computing devices of the multiple computing devices.

5. The communication system as recited in claim 1, wherein at least one function unit of the multiple function units has a redundant design.

6. The communication system as recited in claim 1, wherein at least one computing device of the multiple computing devices has a redundant design.

7. The communication system as recited in claim 6, wherein the redundantly designed computing device is connected to at least one of the function units using redundant data links.

8. The communication system as recited in claim 1, wherein at least one first computing device of the multiple computing devices is configured to carry out tasks of or for driver assistance systems and/or to at least partially carry out automated driving.

9. The communication system as recited in claim 1, wherein at least one second computing device of the multiple computing devices is configured to carry out tasks of or for a vehicle integration platform, the vehicle integration platform being for a drive train and/or or power train and/or chassis and/or body and/or lights and/or heating, ventilation and air-conditioning technology.

10. The communication system as recited in claim 1, wherein at least one third computing device of the multiple computing devices is configured to carry out tasks of or for infotainment and/or connectivity.

11. The communication system as recited in claim 1, wherein at least one of the multiple function units includes at least one of the following elements: a) control unit, b) actuator, c) sensor.

12. The communication system as recited in claim 1, wherein at least one of the multiple function units is configured to carry out functions for at least one of the following aspects: a) distance measurement with the aid of radar, b) radar, c) camera, d) steering, e) brake, f) airbag, g) internal combustion engine, h) transmission, i) generator, j) interior, k) lights, l) human/machine interface, m) driver supervision system, n) vehicle infrastructure tasks.

13. The communication system as recited in claim 1, wherein the first communication network is configured to transfer gigabit bandwidths via data links based on gigabit Ethernet or LVDS (Low-voltage Differential Signaling) or PCI (Peripheral Component Interconnect) (express) or HDBaseT (High Definition Base T).

14. The communication system as recited in claim 13, wherein the first communication network includes gigabit Ethernet-based data links.

15. The communication system as recited in claim 1, wherein at least one of the second communication networks includes a data link based on at least one of the following types: a) Ethernet, b) LVDS (Low-voltage Differential Signaling), c) CAN (Controller Area Network), d) FlexRay, e) LIN (Local Interconnected Network), f) MOST Media Oriented Systems Transport), g) PCIe (Peripheral Component Interconnect Express), h) HDBaseT (High Definition Base T).

16. A motor vehicle, comprising:
at least one communication system including:
multiple computing devices which are connected to each other using a first communication network including a ring topology, and
multiple function units which are each associated with different functions of the vehicle and are assigned to different second communication networks, at least one function unit of the multiple function units including a data link to at least two different computing devices of the multiple computing devices;
wherein two computing devices are provided in the first communication network; and
wherein the two computing devices are configured to at least temporarily supervise each other.

17. A method for operating a communication system for a vehicle, the communication system including multiple computing devices which are connected to each other via a first communication network including a ring topology, and multiple function units which are each associated with different functions of the vehicle and are assigned to different second communication networks, the method comprising:
maintaining or using, by at least one function unit of the multiple function units, a data link to at least two different computing devices of the multiple computing devices;
wherein two computing devices are provided in the first communication network; and
wherein the two computing devices are configured to at least temporarily supervise each other.

18. A method of using a communication system for a vehicle, the method comprising:
providing the communication system including multiple computing devices which are connected to each other using a first communication network including a ring topology, and multiple function units which are each associated with different functions of the vehicle and are assigned to different second communication networks, at least one function unit of the multiple function units including a data link to at least two different computing devices of the multiple computing devices; and
using the communication system for at least one of the following: a) increasing an error tolerance of the communication system, b) avoiding a common cause error, c) supplying data to data sinks, d) establishing a diverse redundancy;
wherein two computing devices are provided in the first communication network; and
wherein the two computing devices are configured to at least temporarily supervise each other.

* * * * *